US010034159B2

(12) United States Patent
Deck

(10) Patent No.: US 10,034,159 B2
(45) Date of Patent: Jul. 24, 2018

(54) ACCOMMODATING INTERFERENCE BETWEEN WIRELESS STREAMING AND CONTROL PROTOCOLS

(71) Applicant: SEMICONDUCTOR COMPONENTS INDUSTRIES, LLC, Phoenix, AZ (US)

(72) Inventor: Christopher John Deck, Kitchener (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 1 day.

(21) Appl. No.: 15/430,058

(22) Filed: Feb. 10, 2017

(65) Prior Publication Data

US 2017/0265025 A1   Sep. 14, 2017

Related U.S. Application Data

(60) Provisional application No. 62/307,045, filed on Mar. 11, 2016.

(51) Int. Cl.
*H04B 7/00* (2006.01)
*H04W 4/80* (2018.01)
(Continued)

(52) U.S. Cl.
CPC ........... *H04W 4/80* (2018.02); *H04L 43/0829* (2013.01); *H04L 43/16* (2013.01); *H04W 4/008* (2013.01); *H04W 80/00* (2013.01)

(58) Field of Classification Search
CPC ....... H04W 84/12; H04W 4/02; H04W 72/04; H04W 88/08; H04B 10/2581; H04B 2203/5441; H04J 11/0053
See application file for complete search history.

(56) References Cited

U.S. PATENT DOCUMENTS

| 8,150,268 B1 * | 4/2012 | Leeb | H04B 10/116 398/172 |
| 8,886,053 B2 * | 11/2014 | Lupton | H04B 10/116 398/172 |

(Continued)

OTHER PUBLICATIONS

IEEE Computer Society, "802.15.4TM: IEEE Standard for Information technology—Telecommunications and Information exchange between systems—Local and metropolitan area networks—Specific requirements; Part 15.4: Wireless Medium Access Control (MAC) and Physical Layer (PHY) Specifications for Low-Rate Wireless Personal Area Networks (LR-WPANs)," the Institute of Electrical and Electronics Engineers, Inc. Oct. 1, 2003, 679 pages.

(Continued)

*Primary Examiner* — Edward Urban
*Assistant Examiner* — Max Mathew
(74) *Attorney, Agent, or Firm* — Ramey & Schwaller, LLP

(57) ABSTRACT

Disclosed wireless systems, devices, and methods accommodate interference between different communication protocols. One illustrative wireless communications system embodiment includes: an accessory device and a media device. The accessory device supports a wireless streaming protocol and a wireless control protocol that interferes with the wireless streaming protocol. The media device intermittently communicates with the accessory device via the wireless control protocol while streaming an audio signal to the accessory device via the wireless streaming protocol, limiting a duration of each wireless control protocol communication interval to less than a guaranteed packet loss threshold (which exceeds twice the potential packet loss threshold) of the wireless streaming protocol. The devices may each include a radio module and a controller. The radio module operates in a first wireless mode to support the (Continued)

wireless control protocol, and operates in a second wireless mode to support the wireless streaming protocol, where the first modes are incompatible. The controller switches the radio module between the first and second wireless modes with a first mode duration less than a predetermined threshold.

16 Claims, 3 Drawing Sheets

(51) Int. Cl.
*H04W 4/00* (2018.01)
*H04L 12/26* (2006.01)
*H04W 80/00* (2009.01)

(56) References Cited

U.S. PATENT DOCUMENTS

| | | | |
|---|---|---|---|
| 2009/0017785 A1* | 1/2009 | Qian | H04B 1/0007 455/307 |
| 2009/0238158 A1* | 9/2009 | Lewis | H04W 72/1257 370/338 |
| 2014/0064212 A1* | 3/2014 | Ko | H04W 4/80 370/329 |
| 2016/0276983 A1* | 9/2016 | Vaillancourt | H03F 3/195 |
| 2017/0127304 A1* | 5/2017 | Britt | H04W 24/08 |

OTHER PUBLICATIONS

On Semiconductor, "Ezairo® 7150 SL—Wireless-Enabled DSP-Based Hybrid," Product Brief, 2016, 2 pages.
Texas Instruments, "WiLink™ 8 Solutions—Coexistence Solution Highlights," Oct. 2013, 15 pages.

\* cited by examiner

ACCOMMODATING INTERFERENCE BETWEEN WIRELESS STREAMING AND CONTROL PROTOCOLS

REFERENCE TO RELATED APPLICATIONS

The present application claims priority to Provisional U.S. Application 62/307,045, filed 2016 Mar. 11 and titled "Redundant Protocol Co-Existence" by inventor C. J. Deck. This reference is hereby incorporated herein by reference.

BACKGROUND

The ubiquity of potentially interfering wireless communication technologies presents challenges to their coexistence. For example, a Long-Term Evolution (LTE) or LTE-Advanced (LTE-A) radio may operate in a Time Division Duplex (TDD) mode at 2.300-2.400 GHz (Band 40), while a WiFi radio may operate at 2.400-2.484 GHz and a Bluetooth or Bluetooth Low Energy (BLE) radio may operate at 2.402-2.480 GHz. Simultaneous use of such adjacent and overlapping frequency bands by antennas and RF circuitry in close proximity generally results in noticeable performance degradation. Yet design requirements for compact devices may necessitate multiple antennas and radio modules to be located in close proximity or, alternatively, that a given antenna and radio module be employed for operation with the interfering wireless communication protocols.

One conventional solution is to avoid the coexistence issue entirely by excluding the use of more than one wireless communications protocol at any given time. Yet certain systems and devices cannot be feasibly restricted to the use of a single wireless communication protocol. For example, a battery-powered device such as a wireless headset, earbud, hearing aid, or other wearable speaker may need to employ BLE as a wireless control protocol to maximize battery life, despite the limited bandwidth it offers. At the same time, a high-bandwidth low-latency protocol may be needed for, e.g., multimedia data stream interactions with a mobile phone or other internet-connected device. While it is conceivable that a single, novel communications protocol could be created to address such diverse requirements, the associated complexity and loss of compatibility with existing standards would be highly undesirable.

SUMMARY

Accordingly, there are disclosed herein wireless systems, devices, and methods that accommodate interference between different communication protocols. One illustrative wireless communications system embodiment includes: an accessory device and a media device. The accessory device supports a wireless streaming protocol and a wireless control protocol that interferes with the wireless streaming protocol. The media device intermittently communicates with the accessory device via the wireless control protocol while streaming an audio signal to the accessory device via the wireless streaming protocol, limiting a duration of each wireless control protocol communication interval to less than a guaranteed packet loss threshold (which exceeds twice the potential packet loss threshold) of the wireless streaming protocol.

An illustrative wireless network device embodiment includes: a radio module and a controller. The radio module operates in a first wireless mode to support a first communications protocol having intermittent communication intervals, and operates in a second wireless mode to support a second communications protocol having packet streaming with redundancy, where the first wireless mode is incompatible with the second wireless mode. The controller switches the radio module between the first and second wireless modes with a first mode duration less than a predetermined threshold.

An illustrative method embodiment of communicating with co-existing wireless protocols for streaming and control includes: (a) communicating a data stream from a transmitting device to a receiving device using a wireless streaming protocol; (b) dropping portions of the data stream at the transmitting or receiving device to provide intermittent communication intervals for a wireless control protocol; and (c) communicating a control signal during said intermittent communication intervals, where each intermittent communication interval has a duration less than a predetermined threshold.

Each of the foregoing embodiments may be employed separately or in combination, and may have one or more of the following features in any combination: (1) at least one of the wireless control protocol communication intervals has a duration that exceeds the potential packet loss threshold. (2) the wireless streaming protocol provides each streaming packet with R repetitions, where R is a positive integer. (3) the wireless streaming protocol provides Nth-order interleaving, where N is an integer greater than 1. (4) the wireless control protocol is Bluetooth Low Energy (BLE), ZigBee, Thread, or a similar low-rate wireless personal area network protocol. (5) the media device is a mobile phone that receives the audio signal wirelessly, and wherein the accessory device is a headset, earbud, hearing aid, or wearable speaker. (6) the predetermined threshold is less than or equal to a potential packet loss threshold of the second communications protocol. (7) the controller adjusts a relative timing of the first and second communications protocols. (8) the predetermined threshold is less than or equal to a guaranteed packet loss threshold of the second communications protocol. (9) the predetermined threshold exceeds a potential packet loss threshold. (10) the second communications protocol provides R repetitions of each streaming packet. (11) the second communications protocol provides Nth-order non-offset interleaving. (12) the potential packet loss threshold is $T=NRD-P$. (13) the first and second communications protocols couple the device to different remote devices. (14) the method further includes: adjusting a timing of the intermittent communication intervals relative to packet timing of the data stream. (15) the data stream represents an audio signal, and wherein the control signal represents a parameter that affects rendering of the audio signal. (16) the data stream includes streaming packet repetition and interleaving. (17) the receiving device acts as a master to control timing of the intermittent communication intervals.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
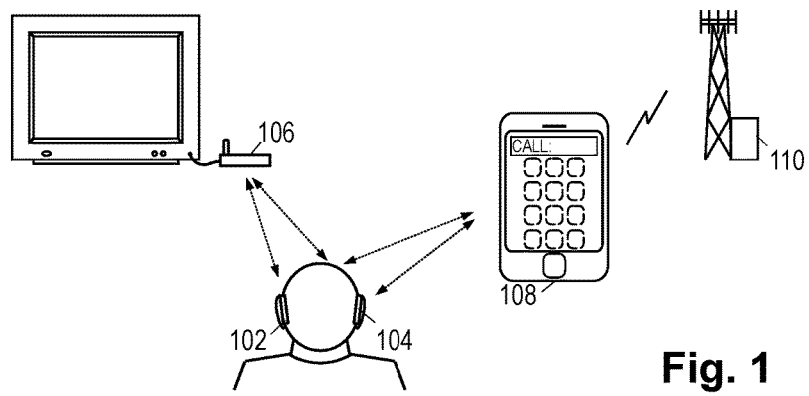
FIG. 1 is an environmental view of an illustrative wireless system.

FIG. 1 is an environmental view of an illustrative wireless system. The illustrative system includes two accessory devices 102, 104, two media devices 106, 108, and a network access point 110. The illustrated accessory devices 102, 104 are hearing aids, but other suitable accessory devices include headsets, body-mounted cameras, mobile displays, or other wireless devices that can receive or send a data stream from/to a media device using a wireless streaming protocol. Received data streams may be rendered as vibrations, beeps, analog sound, videos, and the like.

Illustrated media device 106 is a dongle that attaches to a television, computer, or other video display. In some embodiments, the dongle 106 captures an audio signal, converts it to a representative data stream, and transmits the data stream to the accessory devices 102, 104 using a wireless streaming protocol. In other embodiments, the dongle 106 receives a data stream from one or more of the accessory devices 102, 104, and optionally stores or converts the data stream into audio and/or video signals for display on the television, computer, or other video display.

Illustrated media device 108 is a mobile phone, tablet, or other processing device having access to a network access point 110 (shown here as a cell tower). Similarly to device 106, media device 108 sends and receives streaming data, communicating with the accessory devices 102, 104 to enable a user to converse with (or otherwise interact with) a remote user, service, or computer application. Media device 108 may be further configured (e.g., by a downloadable application) to act as a remote control device that wirelessly monitors and controls the settings of the accessory devices 102, 104. Thus, for example, media device 108 may monitor a battery charge for each of the accessory devices 102, 104 and alert the user when recharging is needed. The media device 108 may further be used for switching power on and off, volume control, equalization, filtering, and in general adjusting any parameter that affects the rendering of the data streams received by the accessory devices, or any parameter that affects the acquisition of the data streams transmitted by the accessory devices.

Multimedia data streaming entails rendering ("playing") the content represented by the data stream as it is being delivered. While some degree of buffering may be employed, such buffering would be subject to latency limitations. For example, latencies in excess of 200 ms are noticeable to participants in a conversation and widely regarded as undesirable. Data streams can be transported over LTE, WiFi, Bluetooth, or other wireless protocols offering sufficient bandwidth. Such protocols support wireless packet transmission, and may be used as a platform for transporting an existing or customized streaming protocol which offers enhanced performance and reliability. As discussed further below, wireless streaming protocols may offer packet repetition and interleaving to improve resistance to interference and other causes of packet loss.

Monitoring and control of battery charge and device settings can in most instances be done with very low data rates, making the use of a high rate wireless communications protocol unnecessarily wasteful for such purposes. An intermittent wireless packet communication protocol, such as Bluetooth Low Energy (BLE) or one of the IEEE 802.15.4-compliant low-rate wireless personal area network (LR-PAN) protocols (e.g., ZigBee, Thread), provides far more efficient usage of bandwidth and energy. The accessory devices 102, 104, may accordingly employ such a protocol for wireless control. Even while wireless streaming is occurring with a given media device, the accessory devices may exchange intermittent packet communications with the given media device and/or with other remote devices that are members of the wireless network.

Figure 2:
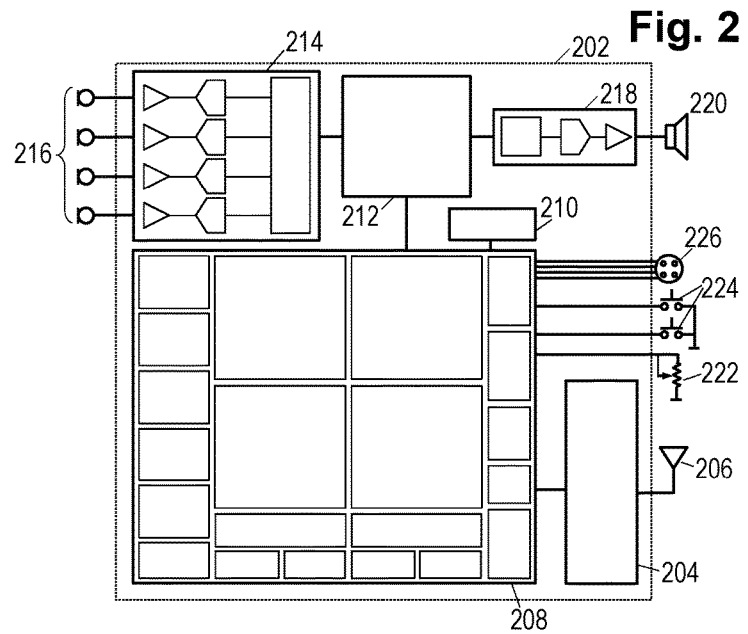
FIG. 2 is a block diagram of an illustrative wireless device.

FIG. 2 is a block diagram of an illustrative wireless network device 202 that supports the use of interfering wireless control and wireless streaming protocols. The wireless network device may be an accessory device or a media device. It includes a radio frequency (RF) module 204 (at times referred to as a radio module) coupled to an antenna 206 to send and receive wireless communications. The radio module 204 is coupled to a controller 208 that sets the operating parameters (including the wireless protocol mode) of the radio module 204 and employs it to transmit and receive wireless control communications and wireless streaming communications. The controller 208 is preferably programmable, operating in accordance with firmware stored in a nonvolatile memory 210. A volatile system memory 212 may be employed for digital signal processing and buffering.

A signal detection unit 214 collects, filters, and digitizes signals from local input transducers 216 (such as a microphone array). The detection unit 214 further provides direct memory access (DMA) transfer of the digitized signal data into the system memory 212, with optional digital filtering and downsampling. Conversely, a signal rendering unit 218 employs DMA transfer of digital signal data from the system memory 212, with optional upsampling and digital filtering prior to digital-to-analog (D/A) conversion. The rendering unit 218 may amplify the analog signal(s) and provide them to local output transducers 220 (such as a speaker array).

Controller 208 extracts digital signal data from the wireless streaming packets received by radio module 204, optionally buffering the digital signal data in system memory 212. The controller 208 may combine the buffered signal data from the local transducers with any buffered signal data from the radio module, applying filtering and digital signal processing as desired to produce a digital output signal which may be directed to the local output transducers 220 and/or packetized and forwarded to the radio module 204 for transmission. Controller 208 may further include general purpose input/output (GPIO) pins to measure the states of control potentiometers 222, switches 224, and terminals of a diagnostic connector 226. The controller 208 may use those states to provide for manual or local control of on/off state, volume, filtering, and other rendering parameters.

At least some contemplated embodiments of controller 208 include a RISC processor core, a digital signal processor core, special purpose or programmable hardware accelerators for filtering, array processing, and noise cancelation, as well as integrated support components for power management, interrupt control, clock generation, and standards-compliant serial and parallel wiring interfaces. The software or firmware stored in memories 210, 212, may cause the processor core(s) of the controller 208 to implement a wireless communication method with interfering wireless protocols, switching the operating mode of the radio module 204 in a controlled fashion that permits the interfering protocols to coexist.

Figure 3:
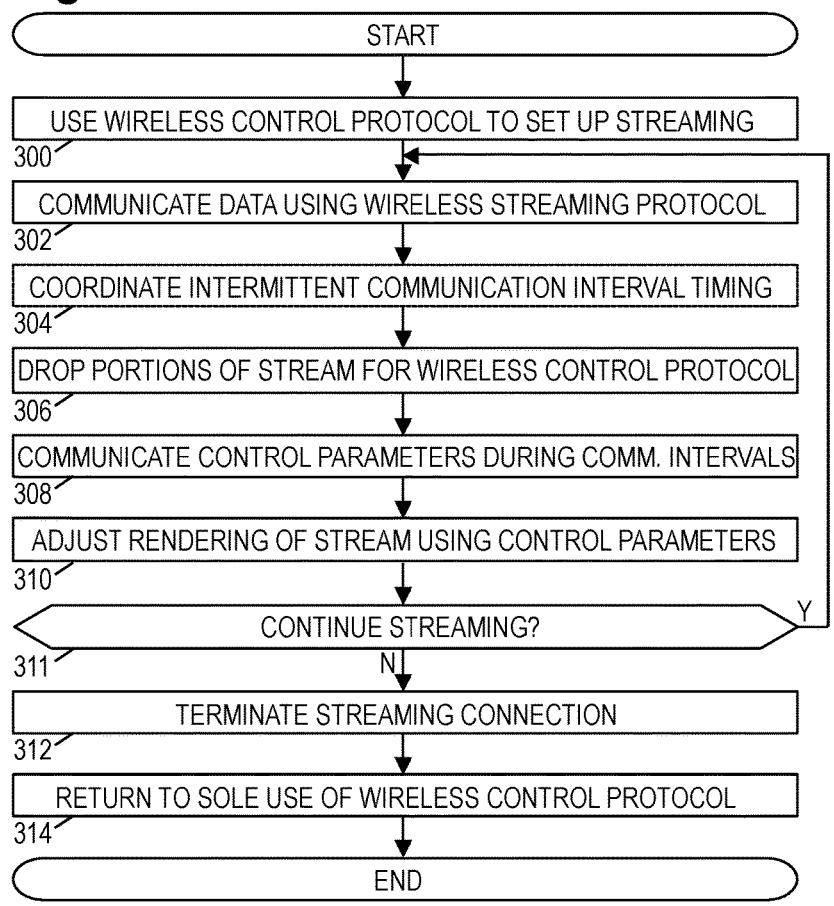
FIG. 3 is a flow diagram of an illustrative wireless communication method.

FIG. 3 provides a flow diagram of one such illustrative wireless communications method that may be implemented by the controller 208 or by any device in the illustrative wireless network of FIG. 1. The method begins in block 300 with the wireless network device employing a wireless control protocol to communicate intermittent packets of information to provide monitoring and control of the device. The wireless control protocol may be used, for example, to detect and identify other devices in the wireless network, determine their capabilities and authorization status, and communicate the device's own status and capability information to such other devices as may be authorized to receive it. The wireless network device may use the wireless control protocol to establish a wireless streaming connection with a media device to send and receive data streams representing audio signal, video signals, or other multimedia information.

In block 302 the wireless network device employs a wireless streaming protocol to communicate with the media device to send and/or receive data streams. As discussed below, the streaming protocol may be expected to employ frequent exchanges of high bandwidth streaming packets that may interfere with, or require the radio module to operate in a different wireless mode than, the wireless control protocol. In optional block 304, the device may adjust the relative timing of the intermittent communication intervals of the wireless control protocol relative to the wireless streaming packets. The BLE protocol, for example, enables the initiating device (the "master") to set the frequency and timing of the packet communication intervals, and further enables the responding device (the "slave") to request the master to make changes to the frequency and timing. As discussed below, the ability to adjust relative timing so as to "schedule" the intermittent communication intervals, is potentially advantageous.

In block 306, the wireless network device drops portions of the data stream being communicated via the wireless streaming protocol to accommodate intermittent communication intervals for the wireless control protocol. This "dropping" operation may vary depending on whether the wireless network device is sending the data stream (and thus acting as a transmitting device), receiving the data stream (and thus acting as a receiving device, or both.

It is contemplated that the transmitting device would omit the dropped portions of the data stream, neglecting to transmit the dropped portions at all. It is contemplated that the receiving device would ignore or screen out the dropped portions of the data stream, treating those portions as undesired interference with the wireless control protocol communications. Where streaming packets are to be both transmitted and received during a communication interval set aside for the wireless control protocol, the transmitted streaming packets are omitted and the streaming packets intended for reception are ignored.

Accordingly, in block 308, the device sets the radio module to operate in a wireless control mode for the duration of an intermittent communication interval. While in this mode, the radio module operates to send and receive control information packets in accordance with the wireless control protocol, and further operates to screen out or ignore communications that are not compliant with the wireless control protocol. In block 310, the device processes the control information to, e.g., adjust the volume, equalization, or other rendering parameters affecting the conversion of the data stream content into analog signals and/or conversion of analog signals into digital streaming data.

In block 311, the device determines whether streaming should continue and, if so, the radio module is placed back into wireless streaming mode and blocks 302-311 are repeated. Otherwise, in block 312, the device terminates the connection, discontinuing streaming. In block 314, the device resumes non-streaming operations in which wireless communications are only performed in accordance with the wireless control protocol.

Figure 4A:
FIG. 4A is a timeline of an illustrative collision event between different wireless protocols.

To illustrate the potential interference between coexisting wireless protocols, FIG. 4A shows a timeline with time increasing from left to right. A series of numbered blocks represents the wireless streaming packets that may be communicated in accordance with a wireless streaming protocol. Each streaming packet has an associated packet duration 402 which is less than or equal to the duration of a streaming packet interval 404. The streaming packets are shown with an index number and a subscript. Matching index numbers indicate redundant packets, with the subscripts indicating the repetition number starting at zero for the original and incrementing for each repetition. Because such duplication of information offers multiple chances for the receiver to receive the transmitted packet information in an uncorrupted form, such repetition offers a low-complexity method for improving reliability (as indicated by reduced probability of information loss) of a communications link that may be subject to noise or other interference. The tradeoff for such enhanced reliability is an increased bandwidth requirement. Other suitable, less costly techniques are known for providing a data stream with controlled redundancy (such as channel coding) and can be employed for a small increase in encoding and decoding complexity. For simplicity of explanation, however, a simple repetition approach is presumed here.

FIG. 4A shows the wireless streaming protocol as employing double redundancy for each wireless streaming packet, sending each original packet (subscript 0) with two subsequent repetitions (subscripts 1 and 2). No interleaving is employed here, so that the repetitions immediately follow the original. This protocol has a potential packet loss threshold equal to two streaming packet intervals minus the duration of a streaming packet. Representing the duration of a packet as P, the duration of a packet interval as D, the number of repetitions after an original packet as R, and the degree of interleaving (to be explained later) as N, where N=1 when no interleaving is used, the threshold T for potential packet loss is expressible as:

$$T=NRD-P. \tag{1}$$

The protocol will withstand any noise burst or interference having a duration shorter than this threshold without information loss. Above this threshold, but below a threshold U for guaranteed packet loss, packet loss may occur, depending on the timing of the interference. Above the threshold U, information loss cannot be avoided, regardless of timing. The threshold U for guaranteed packet loss is expressible as:

$$U=2NRD+(D-P)=2T+D+P. \tag{2}$$

For the example in FIG. 4A, the guaranteed packet loss threshold is five streaming packet intervals minus the duration of a streaming packet, more than twice the potential packet loss threshold T. Thus, if the relative timing can be controlled, interference can be tolerated for more than twice the potential packet loss threshold of the wireless streaming protocol.

FIG. 4A shows a collision event in which the wireless control protocol packets (indicated by cross-hatching) interferes with the wireless streaming packets. Such wireless control protocol packets may be provided from the local device, the remote device communicating the streaming packets with the local device, or a different remote device being used as a remote control. The duration of the communication interval employed by the wireless control protocol is shown as approximately 3.5D, which lies between the thresholds T and U. With the illustrated timing, this collision prevents any of the streaming packets for index 02 from being successfully received, so in this instance the 02 packet is lost. (Some interference also occurs with the second repetition of streaming packet 01 and the original streaming packet 03, but the availability of redundant copies enables these packets to be successfully received and rendered despite the loss of five streaming packets.) The loss of a streaming packet may be expected to cause an undesirable gap or glitch in the rendering of the audio signal or other content, causing the user to experience degraded performance.

Figure 4B:
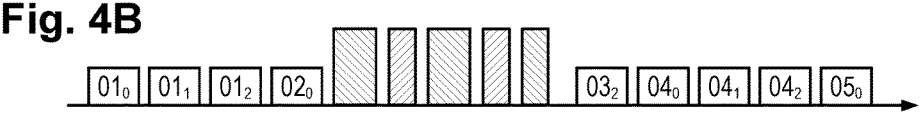
FIG. 4B is a timeline of an illustrative scheduled collision event.

FIG. 4B shows the same wireless streaming protocol being used, along with interference from an intermittent communications interval for the wireless control protocol. In this example, the interference timing has been adjusted so that only four streaming packets are lost, leaving at least one copy of each streaming packet index available for successful reception. The lost packets are shown as being omitted, as would be the case for a device transmitting the data stream, but could alternatively be streaming packets ignored by a receiving device operating in a wireless control mode.

Figure 4C:
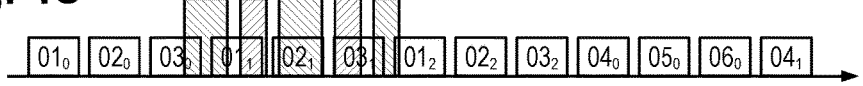
FIG. 4C is a timeline of an illustrative collision event with an interleaved streaming protocol.

FIG. 4C show a wireless protocol that, in addition to repetition, incorporates interleaving. Interleaving may be conceived (and potentially implemented, though more efficient alternatives exist) as the writing of a data stream as horizontal rows in a table before reading out columns of that table for transmission. At the receiving end, the received data may be stored as columns and retrieved as rows having the original order. Consider the example shown in FIG. 5A in which a table is shown at sequential time frames F=1,2. In the first time frame, the table rows each include an original copy of each streaming packet followed by R repetitions of that packet. The table includes N rows to provide N-degree interleaving. Reading from the table in columns causes the original of the first N streaming packets to be sent in order, followed by the first repetition of those packets in order, followed by the next repetition, until all repetitions of those streaming packets have been sent. The table is then reloaded as indicated in Frame F=2 and the process repeated. For 3-way interleaving with R=2 repetitions, the resulting interleaved sequence is as shown in FIG. 4C.

Figure 5A:
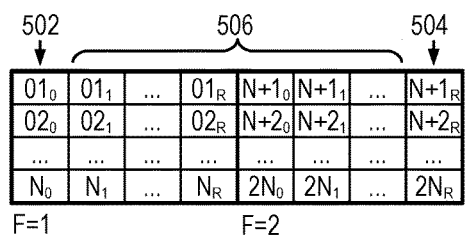
FIG. 5A is a grid for illustrating non-offset interleaving.

As indicated in equations (1) and (2), the use of interleaving increases the thresholds. The threshold T for potential packet loss increases to six packet intervals minus a packet duration, which is greater than the 3.5D duration of the illustrated wireless control interval. At least one uncorrupted copy of each of the first three streaming packets is successfully received, despite the uncontrolled timing of the collision. With timing control, the wireless control interval may be aligned to fit in the region 506 between the first column (502) and last column (504) of two adjacent table frames (FIG. 5A). Stated in another fashion, the intermittent communications interval may be scheduled to occur immediately after the transmission of an original copy of a streaming packet or, in the case of interleaving, after the transmission of the last original copy in a column, as this location generally coincides with the beginning of a maximum duration window for interference without information loss.

Figure 4D:
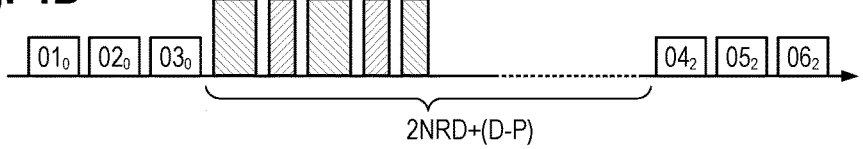
FIG. 4D is a timeline of an illustrative scheduled collision with an interleaved streaming protocol.

FIG. 4D shows the wireless streaming protocol example of FIG. 4C with controlled timing, dropping the packets from region 506 which (according to equation (2)) has a duration of 13D-P, which is more than enough to accommodate three of the illustrated wireless control intervals. Of course, not all of these packets need be dropped, and the interval may be limited to the time strictly required for the intermittent communications interval. If feasible, the intermittent communications interval should be sized and aligned to closely match (including any necessary switching time for the radio module) a whole number of streaming packet intervals, so that bandwidth efficiency is not impaired by leaving unusable fractions of streaming packet intervals before or after each intermittent communications interval.

Figure 5B:
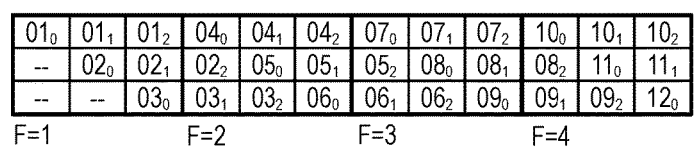
FIG. 5B is a grid for illustrating offset interleaving.

The interleaving used in the foregoing examples and equations is non-offset interleaving, meaning that the interleaved originals are sent together, the first repetitions are sent together, etc. This may be contrasted with offset interleaving as illustrated in FIG. 5B, where an additional time delay is introduced between rows. For clarity, FIG. 5B shows a specific example with N=3 and R=2, arranged over four time frames. Relative to the example of FIG. 5A, the second row is shifted to the right with a "fill" packet in the first column, and the third row is shifted to the right with fill packets in the first two columns. With offset interleaving, the guaranteed packet loss threshold U drops to:

$$U=N(R+1)D+(D-P) \quad (3)$$

with no improvement in the lower threshold T. Accordingly, non-offset interleaving is preferred for the present disclosure. As applied to non-repetition channel coding, each rows of the interleaving table would contain the components of redundancy-providing code words, independent of the code words in other rows.

The foregoing coexistence strategy optimizes implementation simplicity at the potential cost of intermittent increases in error probability when redundant streaming packets are dropped to accommodate the interfering wireless protocol. Thus a device having a 1% (0.01) individual packet loss rate may normally have a $10^{-6}$ information loss rate that is permitted to periodically rise up to 0.01 for one or two packets out of the thousands that may be expected to be exchanged in each second. Such infrequent events may have no discernable impact on system performance while enabling a significantly more affordable and robust implementation with independent protocols for independent operations and low-complexity scheduling.

Any of the controllers described herein, or portions thereof, may be formed as a semiconductor device on a single semiconductor die. Though the operations shown and described in FIG. 3 are treated as being sequential for explanatory purposes, in practice the method may be carried out by multiple integrated circuit components operating concurrently and perhaps even with speculative completion. The sequential discussion is not meant to be limiting. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. The terms first, second, third and the like in the claims or/and in the Detailed Description or the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. Inventive aspects may lie in less than all features of a single foregoing disclosed embodiment. Furthermore, while some embodiments described herein include some but not other features included in other embodiments, combinations of features of different embodiments are meant to be within the scope of the invention, and form different embodiments, as would be understood by those skilled in the art.

What is claimed is:

1. A wireless network device comprising:
   a radio module operable in a first wireless mode to support a first communications protocol having intermittent communication intervals, and operable in a second wireless mode to support a second communications protocol, wherein the first wireless mode is incompatible with the second wireless mode, wherein the second communications protocol has packet streaming with:
   a packet duration P,
   a packet interval duration D,
   R repetitions of each packet, R being a positive integer,
   Nth-order non-offset interleaving, N being a positive integer, and
   a potential packet loss threshold T=NRD−P; and
   a controller that switches the radio module between the first and second wireless modes with a first mode duration less than or equal to the potential packet loss threshold of the second communications protocol.

2. The device of claim 1, wherein the first and second communications protocols couple the device to different remote devices.

3. The device of claim 1, wherein the first communications protocol is Bluetooth Low Energy (BLE) or IEEE 802.15.4-compliant.

4. The device of claim 1, wherein the first communications protocol is a wireless control protocol and the second communications protocol is a wireless streaming protocol.

5. The device of claim 4, wherein the device uses the first communications protocol to receive control settings and uses the second communications protocol to receive an audio signal.

6. The device of claim 5, wherein the device is an accessory device that intermittently communicates with a media device via the first communications protocol while streaming an audio signal from the media device via the second communications protocol.

7. The device of claim 6, wherein the device is an earbud, headset, or hearing aid, and the media device is a mobile phone.

8. A wireless network device comprising:
   a radio module operable in a first wireless mode to support a first communications protocol having intermittent communication intervals, and operable in a second wireless mode to support a second communications protocol, wherein the first wireless mode is incompatible with the second wireless mode, wherein the second communications protocol has packet streaming with:
   a packet duration P,
   a packet interval duration D,
   R repetitions of each packet, R being a positive integer,
   Nth-order non-offset interleaving, N being a positive integer, and
   a potential packet loss threshold T=NRD−P; and
   a controller that switches the radio module between the first and second wireless modes with a first mode duration less than a predetermined threshold, wherein the controller adjusts a relative timing of the first and second communications protocols, and wherein the predetermined threshold exceeds the potential packet loss threshold but is less than or equal to a guaranteed packet loss threshold of the second communications protocol.

9. The device of claim 8, wherein the first and second communications protocols couple the device to different remote devices.

10. The device of claim 8, wherein the first communications protocol is Bluetooth Low Energy (BLE) or IEEE 802.15.4-compliant.

11. The device of claim 8, wherein the first communications protocol is a wireless control protocol and the second communications protocol is a wireless streaming protocol.

12. The device of claim 11, wherein the device uses the first communications protocol to receive control settings and uses the second communications protocol to receive an audio signal.

13. The device of claim 12, wherein the device is an accessory device that intermittently communicates with a media device via the first communications protocol while streaming an audio signal from the media device via the second communications protocol.

14. The device of claim 13, wherein the device is an earbud, headset, or hearing aid, and the media device is a mobile phone.

15. A method of communicating with co-existing wireless protocols for streaming and control, the method comprising:

communicating a data stream from a transmitting device to a receiving device using a wireless streaming protocol, the wireless streaming protocol providing packet streaming with:
  a packet duration P,
  a packet interval duration D,
  R repetitions of each packet, R being a positive integer,
  Nth-order non-offset interleaving, N being a positive integer, and
  a potential packet loss threshold T=NRD−P;
dropping portions of the data stream at the transmitting or receiving device to provide intermittent communication intervals for a wireless control protocol; and
communicating a control signal during said intermittent communication intervals, wherein each intermittent communication interval has a duration less than a predetermined threshold, wherein the predetermined threshold is less than or equal to the potential packet loss threshold.

16. A method of communicating with co-existing wireless protocols for streaming and control, the method comprising: communicating a data stream from a transmitting device to a receiving device using a wireless streaming protocol, the wireless streaming protocol providing packet streaming with:
  a packet duration P,
  a packet interval duration D,
  R repetitions of each packet, R being a positive integer,
  Nth-order non-offset interleaving, N being a positive integer, and
  a potential packet loss threshold T=NRD−P;
dropping portions of the data stream at the transmitting or receiving device to provide intermittent communication intervals for a wireless control protocol;
communicating a control signal during said intermittent communication intervals, wherein each intermittent communication interval has a duration less than a predetermined threshold; and
adjusting a timing of the intermittent communication intervals relative to packet timing of the data stream, wherein the predetermined threshold is less than or equal to twice a potential packet loss threshold of the wireless streaming protocol.

* * * * *